(12) United States Patent
Iwakabe et al.

(10) Patent No.: US 12,147,110 B1
(45) Date of Patent: Nov. 19, 2024

(54) DISPLAY DEVICE

(71) Applicant: Japan Display Inc., Tokyo (JP)

(72) Inventors: Yasushi Iwakabe, Tokyo (JP); Koichi Igeta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/733,959

(22) Filed: Jun. 5, 2024

(30) Foreign Application Priority Data

Jun. 23, 2023 (JP) .................. 2023-103231

(51) Int. Cl.
*G02F 1/1334* (2006.01)
*G02F 1/1347* (2006.01)
*G02F 1/1362* (2006.01)
*G02F 1/1368* (2006.01)

(52) U.S. Cl.
CPC .......... *G02F 1/1334* (2013.01); *G02F 1/1347* (2013.01); *G02F 1/136286* (2013.01); *G02F 1/1368* (2013.01)

(58) Field of Classification Search
CPC ................. G02F 1/1347; G02F 1/1339; G02F 1/134309; G02F 1/136209; G02F 2203/48; G09G 3/3677
See application file for complete search history.

(56) References Cited

U.S. PATENT DOCUMENTS

| | | | |
|---|---|---|---|
| 2002/0109812 A1* | 8/2002 | Takami | G02F 1/13473 349/113 |
| 2016/0116768 A1 | 4/2016 | Okuyama et al. | |
| 2019/0302523 A1* | 10/2019 | Okuyama | G02F 1/1334 |
| 2020/0166796 A1 | 5/2020 | Okuyama et al. | |

FOREIGN PATENT DOCUMENTS

JP 2020-091389 A 6/2020

OTHER PUBLICATIONS

JP 2020091389 A (Year: 2020).*

* cited by examiner

*Primary Examiner* — James A Dudek
(74) *Attorney, Agent, or Firm* — Michael Best & Friedrich LLP

(57) ABSTRACT

According to one embodiment, a display device includes a first display panel, a second display panel, and a first light source, and the first display panel and the second display panel are disposed in contact with each other, the first polymer dispersed liquid crystal layer is provided between the first alignment film and the second alignment film, the second polymer dispersed liquid crystal layer is provided between the third alignment film and the fourth alignment film, a first thickness between the first alignment film and the second alignment film, and a second thickness between the third alignment film and the fourth alignment film are each 2 μm or less.

8 Claims, 10 Drawing Sheets

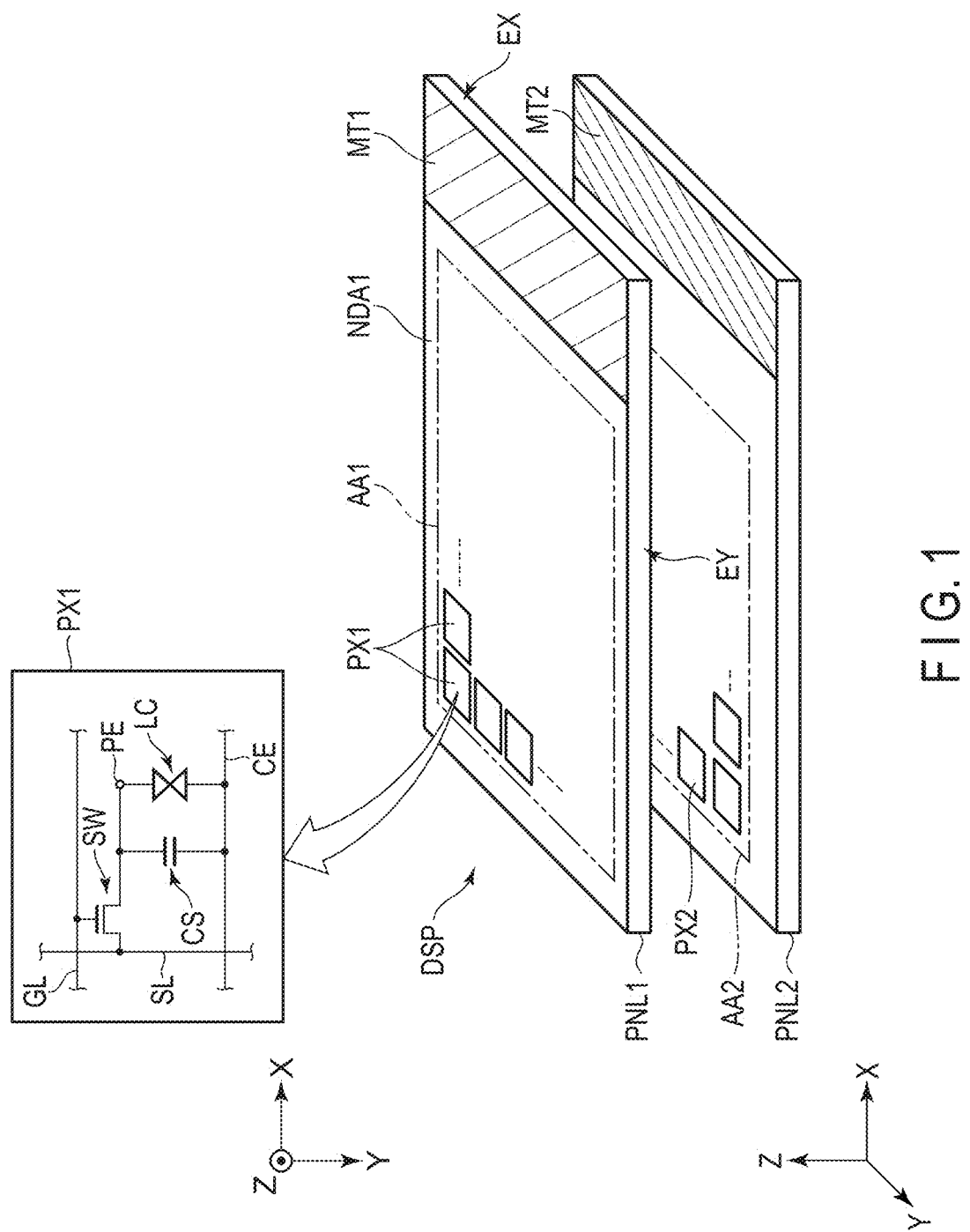
F I G. 1

DISPLAY DEVICE

CROSS-REFERENCE TO RELATED APPLICATIONS

This application is based upon and claims the benefit of priority from Japanese Patent Application No. 2023-103231, filed Jun. 23, 2023, the entire contents of which are incorporated herein by reference.

FIELD

Embodiments described herein relate generally to a display device.

BACKGROUND

Recently, a display device using a polymer dispersed liquid crystal that can switch between a scattering state, in which incident light is scattered, and a transmission state, in which incident light is transmitted, has been proposed.

BRIEF DESCRIPTION OF THE DRAWINGS

FIG. 1 is an exploded perspective view schematically showing a configuration of a display device with two display panels.

DETAILED DESCRIPTION

Figure 2:
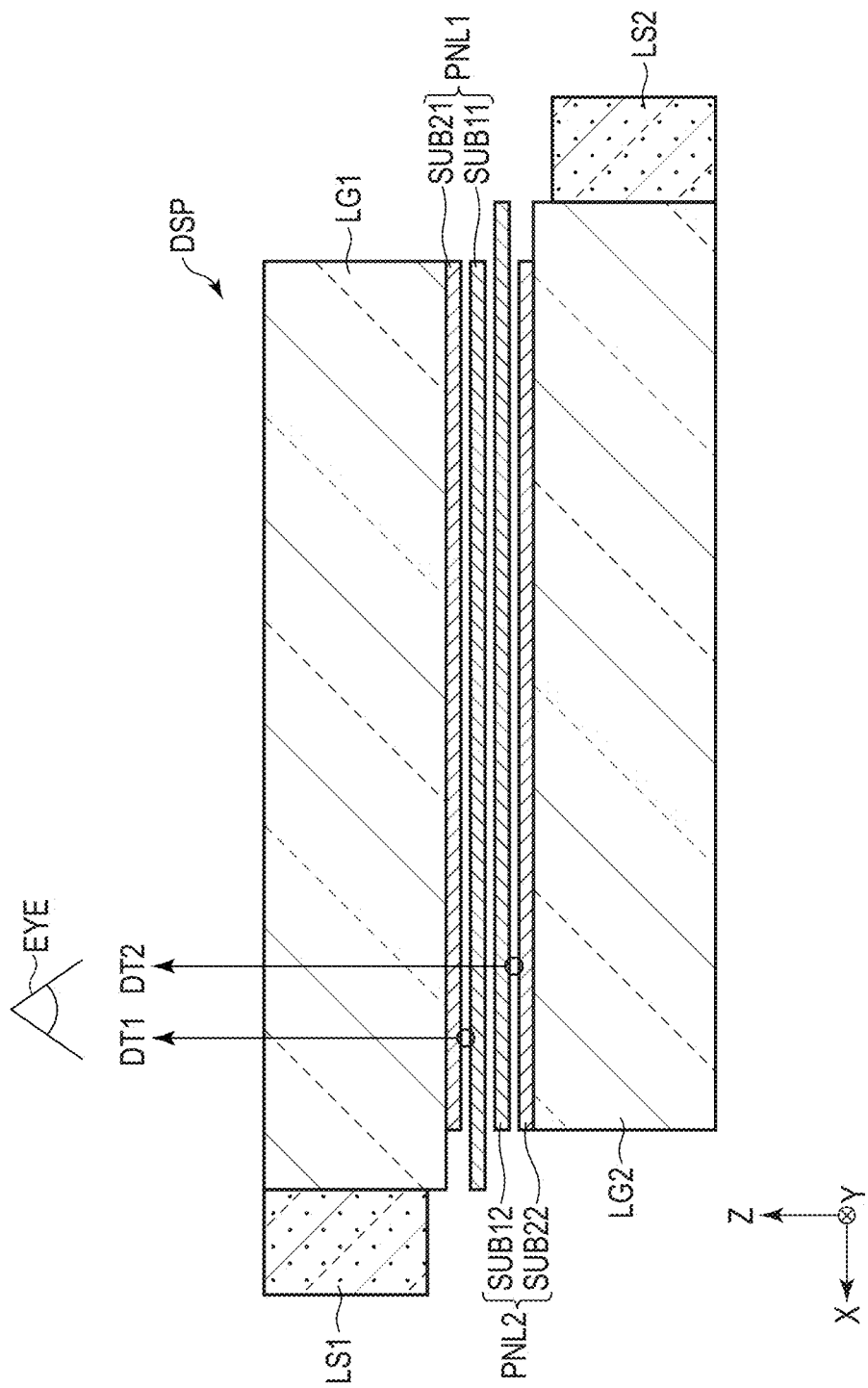
FIG. 2 is a cross-sectional view schematically showing a configuration example of the display device.

In general, according to one embodiment, a display device comprises
a first display panel including a first substrate, a second substrate, and a first polymer dispersed liquid crystal layer provided between the first substrate and the second substrate;
a second display panel including a third substrate, a fourth substrate, and a second polymer dispersed liquid crystal layer provided between the third substrate and the fourth substrate; and
a first light source provided at an end portion of the first display panel,
the first substrate comprising:
a plurality of first signal lines;
a plurality of first signal lines;
a plurality of first pixels partitioned by the plurality of first signal lines and the plurality of first scan lines;
a plurality of first switching elements provided in the plurality of first pixels; and
a first alignment film,
the second substrate comprising a second alignment film opposing the first alignment film,
the third substrate comprising:
a plurality of second signal lines;
a plurality of second scanning lines;
a plurality of second pixels partitioned by the plurality of second signal lines and the plurality of second scanning lines;
a plurality of second switching elements provided in the plurality of second pixels; and
a third alignment film,
the fourth substrate comprising a fourth alignment film opposing the third alignment film, wherein
the first display panel and the second display panel are disposed to be in contact with each other,
the first polymer dispersed liquid crystal layer is provided between the first alignment film and the second alignment film,
the second polymer dispersed liquid crystal layer is provided between the third alignment film and the fourth alignment film,
a distance between the first alignment film and the second alignment film is set to a first thickness,
a distance between the third alignment film and the fourth alignment film is set to a second thickness, and
the first thickness and the second thickness each are 2 μm or less.

An object of this embodiment is to provide a display device in which the polymer-dispersed liquid crystal layer can be decreased to low voltage and the decrease in scattering brightness can be suppressed.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of a display device with reference to the drawings.

In this embodiment, a first direction X, a second direction Y and a third direction Z are orthogonal to each other, but may intersect at an angle other than 90 degrees. The direction toward the tip of the arrow in the third direction Z is defined as up or above, and the direction opposite to the direction toward the tip of the arrow in the third direction Z is defined as down or below. Note that the first direction X, the second direction Y and the third direction Z may as well be referred to as an X direction, a Y direction and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the optical control element on a tip side of the arrow in the third direction Z. Here, viewing from this observation position toward the X-Y plane defined by the first direction X and the second direction Y is referred to as plan view. Viewing a cross-section of the display device in the X-Z plane defined by the first direction X and the third direction Z or in the Y-Z plane defined by the second direction Y and the third direction Z is referred to as cross-sectional view.

EMBODIMENT

FIG. 1 is an exploded perspective view schematically showing a display device comprising two display panels. FIG. 1 shows a three-dimensional space defined by the first direction X, the second direction Y perpendicular to the first direction X, and the third direction Z perpendicular to the first direction X and the second direction Y.

As shown in FIG. 1, the display device DSP comprises a first display panel PNL1 and a second display panel PNL2.

The first display panel PNL1 is, for example, rectangular. In the example illustrated, a short edge EX of the first display panel PNL1 is parallel to the first direction X and a long edge EY of the first display panel PNL1 is parallel to the second direction Y. The third direction Z corresponds to the thickness direction of the first display panel PNL1. A main surface of the first display panel PNL1 is parallel to the X-Y plane defined by the first direction X and the second direction Y. The first display panel PNL1 includes an effective area AA1 (display area) and a non-display area NDA1 located on an outer side of the effective area AA1. The non-display area NDA1 includes a terminal area MT1 on which a driver IC or flexible wiring board is mounted. In FIG. 1, the terminal area MT1 is indicated by shaded lines.

The effective area AA1 is an area which displays images and comprises a plurality of pixels PX1 arranged, for example, in a matrix along the first direction X and the second direction Y. As enlargedly shown in FIG. 1, each of the pixels PX1 is arranged in a region compartmentalized by a respective scanning line GL and a respective signal line SL, and comprises a switching element SW, a pixel electrode PE, a common electrode CE, a liquid crystal layer LC and the like.

The switching element SW is constituted by a thin-film transistor (TFT), for example, and is electrically connected to a respective scanning line GL and a respective signal line SL. The scanning line GL is electrically connected to the switching element SW in each respective one of the pixels PX1 arranged along the first direction X. The signal line SL is electrically connected to the switching element SW in each respective one of the pixels PX1 arranged along in the second direction Y. The pixel electrode PE is electrically connected to the switching element SW. Each of the pixel electrodes PE opposes the common electrode CE, and the liquid crystal layer LC is driven by an electric field produced between the pixel electrode PE and the common electrode CE. The capacitance CS is formed, for example, between an electrode having the same potential as that of the common electrode CE and an electrode having the same potential as that of the pixel electrode PE.

The liquid crystal layer LC comprises a polymer dispersed liquid crystals (PDLC) that contains a polymer and liquid crystal molecules. For example, the polymer is a liquid crystalline polymer. The polymer is formed into a stripe shape extending along one direction. The liquid crystal molecules are dispersed in gaps in the polymer and are aligned such that their long axes are along the direction in which the stripes extend. Each of the polymer and the liquid crystal molecules has an optical anisotropy or refractive index anisotropy. The responsiveness of the polymer to the electric field is lower than that of the liquid crystal molecules to the electric field.

For example, the alignment direction of the polymer does not substantially change regardless of the presence/absence of an electric field. On the other hand, the alignment direction of the liquid crystal molecules changes according to the electric field when a high voltage at a threshold value or higher is applied to the liquid crystal layer LC. While no voltage is being applied to the liquid crystal layer LC, the respective optical axes of the polymer and liquid crystal molecules are parallel to each other, and light entering the liquid crystal layer LC is transmitted (transparent state) without being substantially scattered in the liquid crystal layer LC. While voltage is being applied to the liquid crystal layer LC, the respective optical axes of the polymer and liquid crystal molecules cross each other, and light entering the liquid crystal layer LC is scattered within the liquid crystal layer LC (scattered state).

The terminal area MT1 extends along the short edge EX of the first display panel PNL1. In the terminal area MT1, a terminal portion is formed, and the first display panel PNL1 is electrically connected to, for example, an external device such as a flexible wiring substrate, via the terminal portion.

The second display panel PNL2 has basically the same configuration as that of the first display panel PNL1. The second display panel PNL2 comprises a plurality of pixels PX2 provided in a matrix along the first direction X and the second direction Y in the effective area AA2 (display area). The configuration of the pixel PX2 is similar to that of the pixel PX1, and therefore the above-provided description will be applied here, and a detailed description thereof will be omitted. In this embodiment, the pixels PX1 and the pixel PX2 have the same configuration and the same size. More specifically, the pixels PX1 and the pixels PX2 have the same layer structure. Further, the pixels PX1 and the pixels PX2 have the same lengths in the first direction X and the second direction Y, respectively.

In the second display panel PNL2 as well, the liquid crystal layer comprises a polymer dispersed liquid crystal (PDLC) containing a polymer and liquid crystal molecules. Although not shown in the figure, the liquid crystal layer of the second display panel PNL2 may as well be referred to as a liquid crystal layer LC2. In that case, the liquid crystal layer LC of the first display panel PNL1 may as well be referred to as a liquid crystal layer LC1. When the liquid crystal layer LC1 and the liquid crystal layer LC2 are not particularly distinguished from each other, they may be simply referred to as liquid crystal layers LC.

The second display panel PNL2, as in the case of the first display panel PNL1, includes an effective area AA2 and a non-display area NDA2 located on an outer side of the effective area AA2. The non-display area NDA2 includes a terminal area MT2 on which a driver IC or a flexible wiring board is mounted. The non-display area NDA2 and the terminal area MT2 are similar to the non-display area NDA1 and the terminal area MT1, respectively. The flexible wiring substrates of the first display panel PNL1 and the second display panel PNL2 are electrically connected to each other and further connected to a control element. The pixels PX1 and the pixels PX2 are driven in synchronous with each other by signals from the control element. To the pixels PX1 and the pixels PX2, which respectively overlap each other in planar view, the same video signal is input.

The threshold voltage of the polymer dispersed liquid crystal layer is higher than that of the twisted nematic (TN) liquid crystal layer, for example. Therefore, the polymer dispersed liquid crystal layer need to be driven at high voltage. In order to drive the polymer dispersed liquid crystal layer, it is necessary to use a high-voltage driver.

The threshold voltage of the polymer dispersed liquid crystal layer is proportional to the electric field strength. Here, by reducing the thickness of the polymer dispersed liquid crystal layer, a lower voltage can be achieved. When the polymer-dispersed liquid crystal layer can be made at low voltage, it is no longer necessary to use a high-voltage driver.

However, if the thickness of the polymer dispersed liquid crystal layer is reduced, there is a risk that the scattering brightness may decrease when voltage is applied.

Therefore, by stacking two display panels with thin polymer dispersed liquid crystal layers, as shown in FIG. 1, it is possible to lower the voltage of the polymer dispersed liquid crystal layer and to suppress the decrease in scattering brightness.

FIG. 2 is a cross-sectional view schematically showing a configuration example of the display device. The display device DSP comprises a first display panel PNL1, a second display panel PNL2, a light guide LG1, a light guide LG2, a light source LS1, and a light source LS2.

The first display panel PNL1 emits display light DT1 upward. The second display panel PNL2 emits display light DT2 upward. It is assumed here that the observer is observing the display device DSP from above the display device DSP in a direction opposite to the third direction Z. When the display light DT1 and the display light DT2 reach the eyes EYE of the observer, the observer can visually recognize display images displayed by the display device DSP.

The first display panel PNL1 comprises a substrate SUB11, a substrate SUB21, and a liquid crystal layer (the liquid crystal layer LC1 described above (not shown)) provided between the substrate SUB11 and the substrate SUB21. The substrate SUB11 and the substrate SUB21 are stacked in this order along the third direction Z.

On the substrate SUB21, a light guide LG1 is provided. The material of the light guide LG1 is, for example, glass. Light from the light source LS1 propagates via the light guide LG1, the substrate SUB11, and the substrate SUB21. It is preferable that the light guide LG1 should have a refractive index similar to that of the substrate SUB11 and the substrate SUB21.

The light source LS1 is provided in the end portion of the first display panel PNL1. In more detail, the light source LS1 is provided to oppose the end portion of the light guide LG1. The light source LS1 includes, for example, a light source element which emits red light, a light source element which emits green light, and a light source element which emits blue light. The light source elements are, for example, light emitting diodes (LEDs).

The second display panel PNL2 is arranged in a position that is line symmetrical with the first display panel PNL1 with respect to each of the X-Y plane and the Y-Z plane. In other words, the second display panel PNL2 is arranged in a position vertically inverted with respect to the first display panel PNL1 in the X-Y plane and also horizontally inverted with respect to the Y-Z plane.

The second display panel PNL2 comprises a substrate SUB12, a substrate SUB22, and a liquid crystal layer (liquid crystal layer LC2 (not shown above)) provided between the substrate SUB12 and the substrate SUB22. The substrate SUB22 and the substrate SUB12 are stacked one on another in this order along the third direction Z.

The light guide LG2 is provided in contact with and below the substrate SUB22. The material of the light guide LG2 is, as in the case of the light guide LG1, glass, for example. Light from the light source LS2 propagates through the light guide LG2, the substrate SUB12, and the substrate SUB22. Here, it is preferable that the light guide LG2 should have a refractive index similar to that of the substrate SUB12 and the substrate SUB22.

The substrate SUB11 of the first display panel PNL1 and the substrate SUB12 of the second display panel PNL2 are in contact with each other. Of the surfaces of the substrate SUB11 and the substrate SUB12, those on which the switching element SW is provided are defined as upper surfaces, and those on an opposite side to the upper surface are defined as lower surfaces. The substrate SUB11 and the substrate SUB12 are in contact with each other on their respective lower surfaces.

The light source LS2 is provided at the end portion of the second display panel PNL2. In more detail, the light source LS2 is provided to oppose the end portion of the light guide LG2. As in the case of the light source LS1, the light source LS2 includes, for example, a light source element which emits red light, a light source element which emits green light, and a light source element which emits blue light. The light source elements are, for example, light-emitting diodes.

The light source LS2 is arranged in a position that is line-symmetrical with the light source LS1 with respect to each of the X-Y plane and the Y-Z plane. In other words, the light source LS2 is positioned in a position vertically inverted with respect to the X-Y plane of the light source LS1 and horizontally inverted with respect to the Y-Z plane. That is, the direction in which the light from the light source LS1 enters the light guide LG1 (opposite to the first direction X) and the direction in which the light from the light source LS2 enters the light guide LG2 (the first direction) are opposite to each other. In other words, the direction in which the light from the light source LS1 enters the first display panel PNL1 (opposite to the first direction X) and the direction in which the light from the light source LS2 enters the second display panel PNL2 (the first direction) are opposite to each other.

After the light from the light source LS1 enters the light guide LG1, the light passes through the light guide LG1, the substrate SUB11, and the substrate SUB21, and propagates inside the display panel PNL1. In addition, the light from the light source LS1 passes through the substrate SUB22, the substrate SUB12, and the light guide LG2, and propagates inside the second display panel PNL2.

After the light from the light source LS2 enters the light guide LG2, it passes through the light guide LG2, the substrate SUB12, and the substrate SUB22 and propagates inside the second display panel PNL2. In addition, the light from the light source LS2 passes through the substrate SUB21, the substrate SUB11, and the light guide LG1, and propagates inside the first display panel PNL1.

Figure 3:
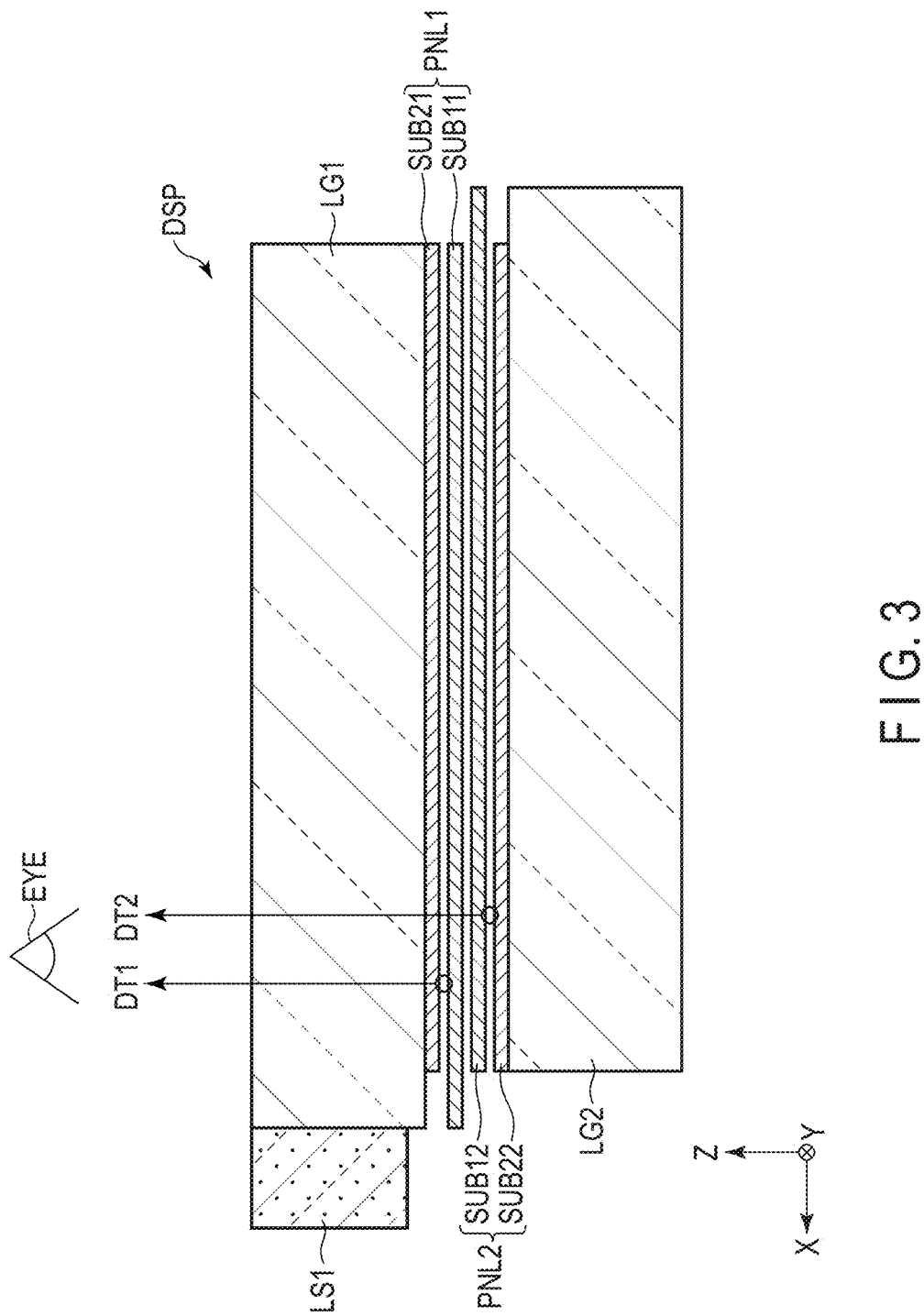
FIG. 3 is a cross-sectional view schematically showing another configuration example of the display device.

FIG. 3 is a cross-sectional view schematically showing a configuration example of the display device. The display device DSP comprises a first display panel PNL1, a second display panel PNL2, a light guide LG1, a light guide LG2, and a light source LS1. The configuration example shown in FIG. 3 is different from the configuration example shown in FIG. 2 in that the light source LS2 is not provided.

In the display device DSP shown in FIG. 3 as well, the first display panel PNL1 emits the display light DT1 upward as shown in FIG. 2. The second display panel PNL2 emits the display light DT2 upward. It is assumed that the observer is observing the display device DSP from above the display device DSP in a direction opposite to the third direction Z. When the display light DT1 and the display light DT2 reach the eyes EYE of the observer, the observer can visually recognize the display images displayed by the display device DSP.

In the display device DSP shown in FIG. 3, the second display panel PNL2 is not provided with a light source. But the light emitted from the light source LS1 provided on the first display panel PNL1 propagates inside the substrate SUB12, the substrate SUB22, and the light guide LG2 of the second display panel PNL2. With this configuration, the second display panel PNL2 can display images.

Figure 4:
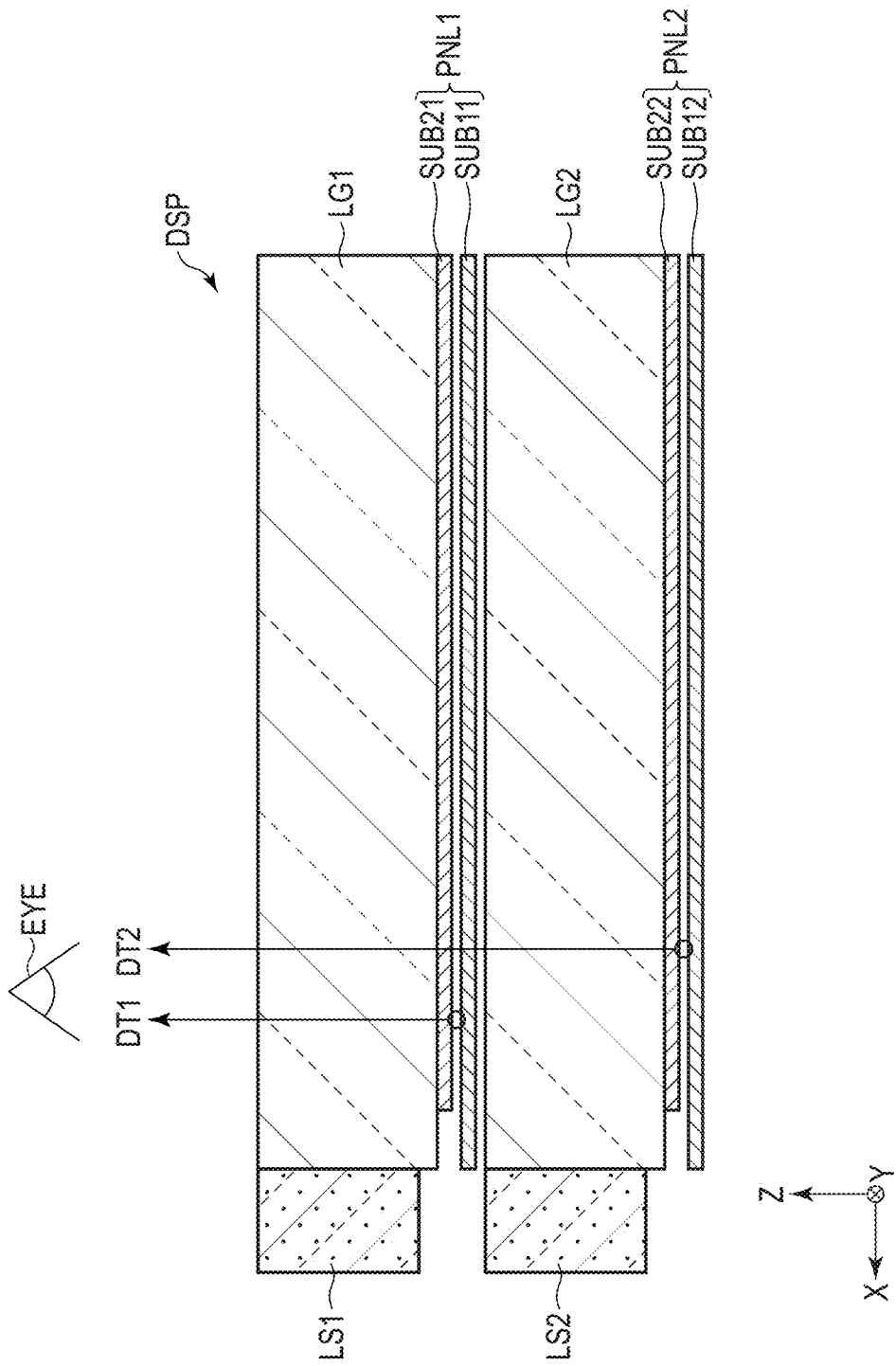
FIG. 4 is a cross-sectional view schematically showing another configuration example of the display device.

FIG. 4 is a cross-sectional view schematically showing a configuration example of the display device. The display device DSP comprises a first display panel PNL1, a second display panel PNL2, a light guide LG1, a light guide LG2, a light source LS1, and a light source LS2. The configuration example shown in FIG. 4 is different from the configuration example shown in FIG. 2 in that the structural elements of the first display panel PNL1 and the second display panel PNL2 are arranged in the same positions with respect to the X-Y plane and the Y-Z plane, respectively.

In the display device DSP shown in FIG. 4, the first display panel PNL1 emits the display light DT1 upward as shown in FIG. 2. The second display panel PNL2 emits the display light DT2 upward. It is assumed that the observer is observing the display device DSP from above the display device DSP in a direction opposite to the third direction Z. When the display light DT1 and the display light DT2 reach the eyes EYE of the observer, the observer can visually recognize display images displayed by the display device DSP.

In the display device DSP shown in FIG. 4, the first display panel PNL1 is similar to that shown in FIG. 2.

In the second display panel PNL2, the substrate SUB12 and the substrate SUB22 are stacked in this order along the third direction Z. On the substrate SUB22, a light guide LG2 is provided. At the end portion of the light guide LG2, a light source LS2 is provided. The light source LS2 opposes the light source LS1 along the third direction Z.

The second display panel PNL2 shown in FIG. 4 has the same configuration as that of the first display panel PNL1. That is, as described above, the structural elements of the first display panel PNL1 and the second display panel PNL2 are arranged are the same positions with respect to the X-Y plane and the Y-Z plane, respectively.

The light guide LG2 and the first display panel PNL1 provided on the second display panel PNL2 are in contact with each other. In more detail, the light guide LG2 and the substrate SUB11 are provided in contact with each other.

In FIG. 4, the direction in which light from the light source LS1 enters the light guide LG1 (opposite to the first direction X) and the direction in which light from the light source LS2 enters the light guide LG2 (opposite to the first direction X) are the same as each other.

Figure 5:
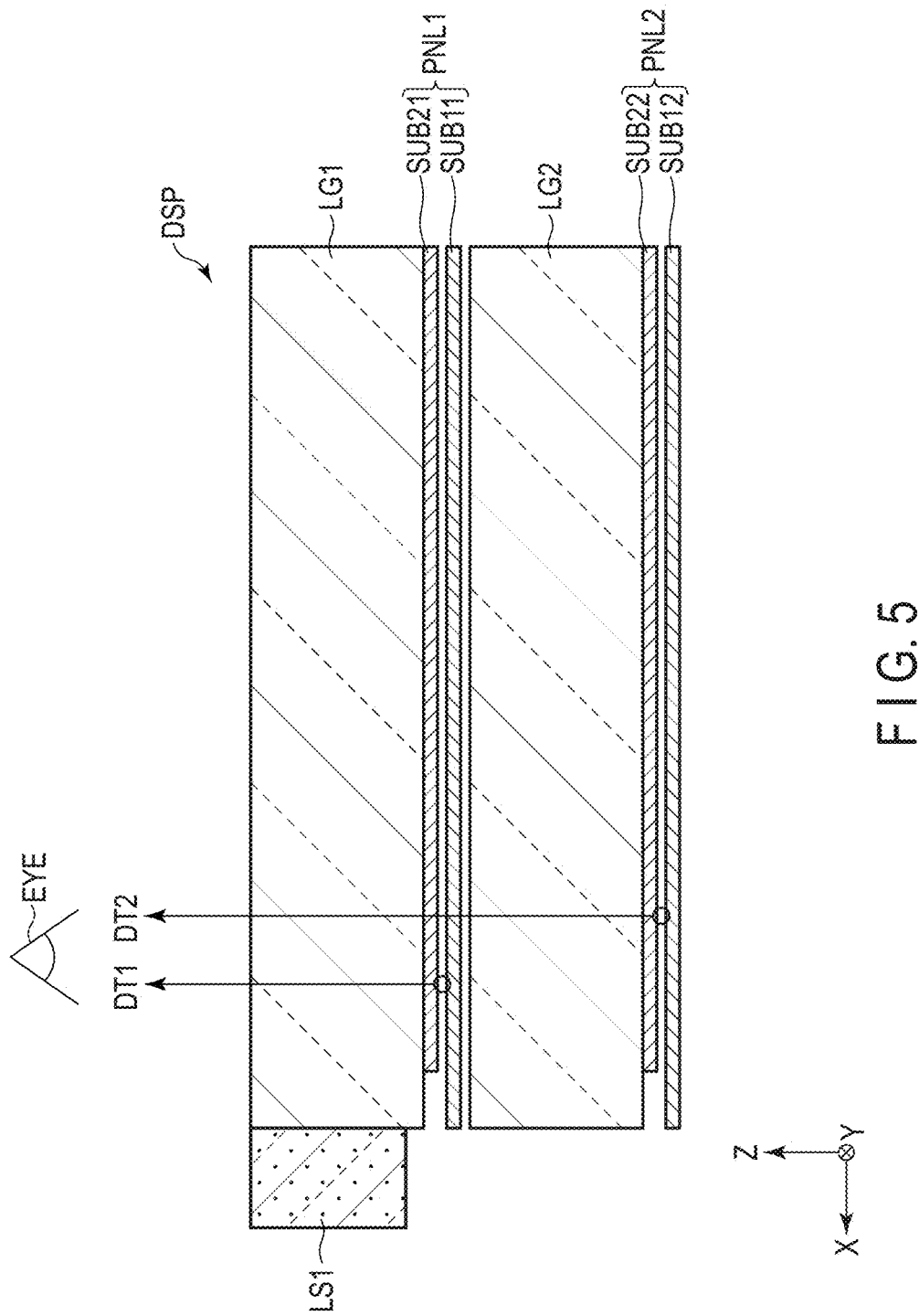
FIG. 5 is a cross-sectional view schematically showing another configuration example of the display device.

FIG. 5 is a cross-sectional view schematically showing a configuration example of a display device. The display device DSP comprises a first display panel PNL1, a second display panel PNL2, a light guide LG1, a light guide LG2, and a light source LS1. The configuration example shown in FIG. 5 is different from the configuration example shown in FIG. 4 in that the light source LS2 is not provided.

In the display device DSP shown in FIG. 5, the first display panel PNL1 emits the display light DT1 upward as shown in FIG. 2. The second display panel PNL2 emits the display light DT2 upward. It is assumed that the observer is observing the display device DSP from above the display device DSP in a direction opposite to the third direction Z. When the display light DT1 and the display light DT2 reach the eyes EYE of the observer, the observer can visually realize display images displayed by the display device DSP.

In the display device DSP shown in FIG. 5, no light source is provided in the second display panel PNL2. But as in the case of the display device DSP shown in FIG. 3, in the display device DSP shown in FIG. 5 as well, the light emitted from the light source LS1 provided on the first display panel PNL1 propagates inside the substrate SUB12, the substrate SUB22, and the light guide LG2 of the second display panel PNL2. With this configuration, the second display panel PNL2 can display images.

Figure 6:
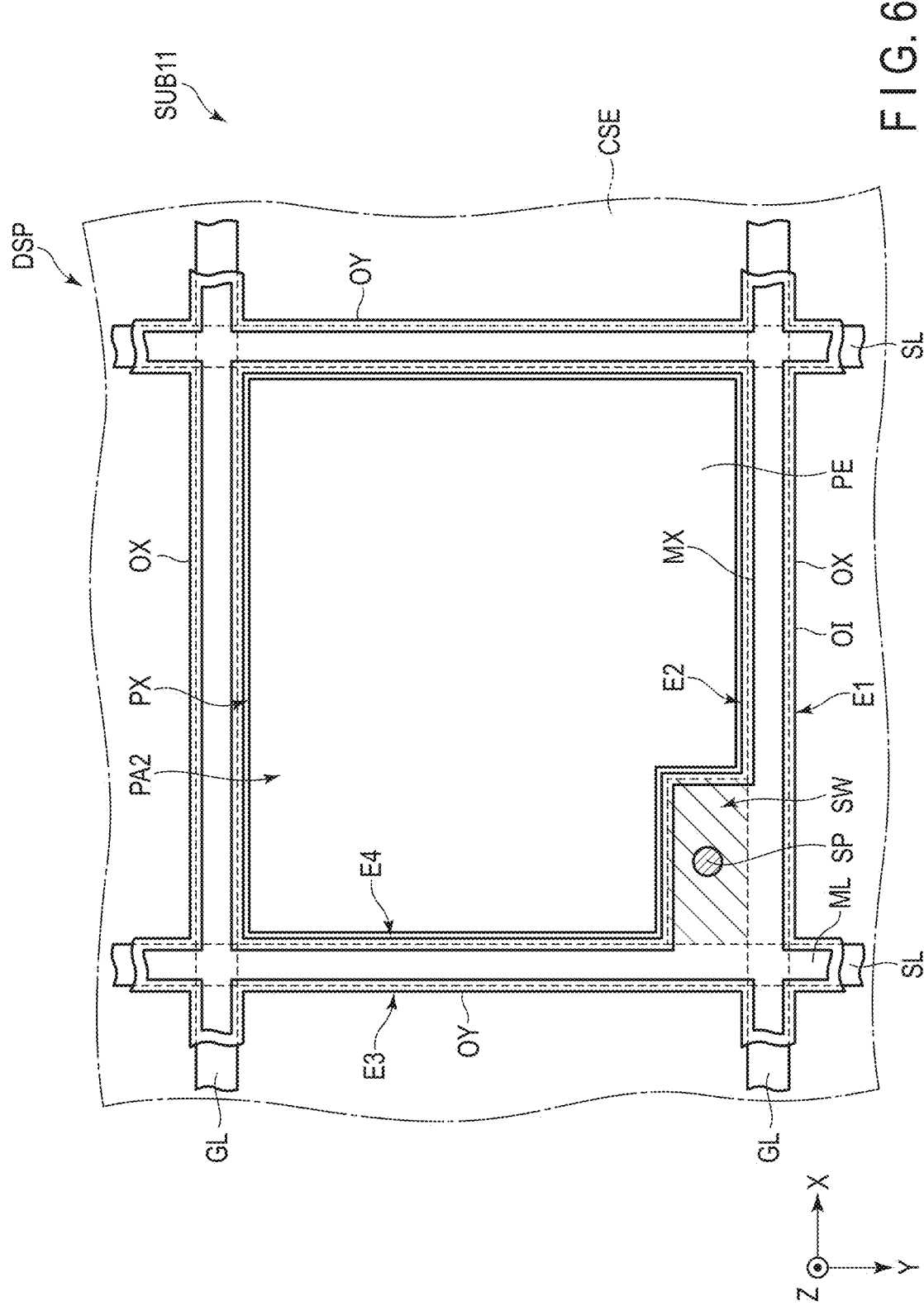
FIG. 6 is a plan view showing a configuration of a pixel in a substrate.

FIG. 6 is a plan view showing a configuration of a pixel PX1 on the substrate SUB11. The substrate SUB11 has a scanning line GL, a signal line SL, a switching element SW, an organic insulating layer OI, a metal wiring line ML, a capacitor electrode CSE, and a pixel electrode PE.

Note that although only the pixel PX1 is shown in FIG. 6, the second display panel PNL2 as well comprises pixels having a configuration similar to that of the pixels PX1 (which is denoted as pixels PX2). The substrate SUB12 has a configuration similar to that of the substrate SUB11.

Two scanning lines GL each extend along the first direction X and are arranged to be spaced apart from each other along the second direction Y. Two signal lines SL each extend along the second direction Y and are arranged to be spaced apart from each other along the first direction X. The pixels PX1 each correspond to the area partitioned by the two signal lines SL and the two scanning lines GL.

The switching element SW is disposed at the intersection of a respective scanning line GL and a respective signal line SL. A specific configuration of the switching element SW will be described later. The switching element SW may be of a bottom-gate type in which the gate electrode is located below the semiconductor layer. The switching element SW may be of a top-gate type in which the gate electrode is located above the semiconductor layer. The semiconductor layer is formed from amorphous silicon, for example, but may as well be formed from polycrystalline silicon or oxide semiconductor.

The organic insulating layer OI is patterned, and in FIG. 6, it is formed in a lattice pattern in plan view. In other words, the organic insulating layer OI is overlapping each of the scanning lines GL, signal lines SL, and switching element SW.

The organic insulating layer OI comprises a first portion OX overlapping the respective scanning line GL and a second portion OY overlapping the respective signal line SL. The first portion Ox includes a first side surface E1 and a second side surface E2 on an opposite side to the first side surface E1. The first side surface E1 and the second side surface E2 extend along the first direction X. The second portion OY includes a third side surface E3 and a fourth side surface E4 on an opposite side to the third side surface E3.

In this embodiment, the region in which the organic insulating layer OI is disposed is designated as a first area PA1 of the substrate SUB11, and the region in which the organic insulating layer OI is not disposed is designated as a second area PA2 of the substrate SUB11. The second area PA2 is located on an inner side of the region surrounded by the first area PA1. The second area PA2 is located on an inner side of the region surrounded by the two signal lines SL and the two scanning lines GL, described above.

The metal wiring line ML is located in the first area PA1 and, in FIG. 6, is formed into a lattice shape in plan view. That is, the metal wiring line ML overlaps each of the respective scanning line GL, the respective signal line SL, and the respective switching element SW. The metal wiring line ML has a first wiring portion MX overlapping the scanning line GL and the first portion OX, and a second wiring portion MY overlapping the signal line SL and the second portion OY.

The capacitor electrode CSE is disposed over a plurality of pixels PX1 and further over the entire area of the substrate SUB11, as shown by a single-dotted line. In other words, the capacitor electrode CSE is located in each of the first area PA1 and the second area PA2. The capacitor electrode CSE overlaps each of the switching elements SW, the scanning lines GL, the signal lines SL, and the organic insulating layer OI in the first area PA1.

Further, the capacitor electrode CSE may be formed into a lattice shape similar to that of the metal wiring line ML. The lattice-shaped capacitor electrode CSE covers the scanning lines GL, the signal lines SL, the switching elements SW, and the side surfaces E (the first side surface E1, the second side surface E2, the third side surface E3, and the fourth side surface E4) of the organic insulating layer OI. That is, the lattice-shaped capacitor electrode CSE includes an aperture in the position of the second area PA2.

The pixel electrode PE is provided in substantially the entire region of the second area PA2. In the example shown in FIG. 6, the pixel electrode PE is provided on an inner side of the area where the organic insulating layer OI is disposed and overlaps the capacitor electrode CSE in the second area PA2. The pixel electrode PE may be provided to overlap each of the first portion OX and the second portion OY.

In the example shown in FIG. 6, a spacer SP is provided to overlap the switching element SW so as to form a predetermined interval between the substrate SUB11 and the substrate SUB21.

Figure 7:
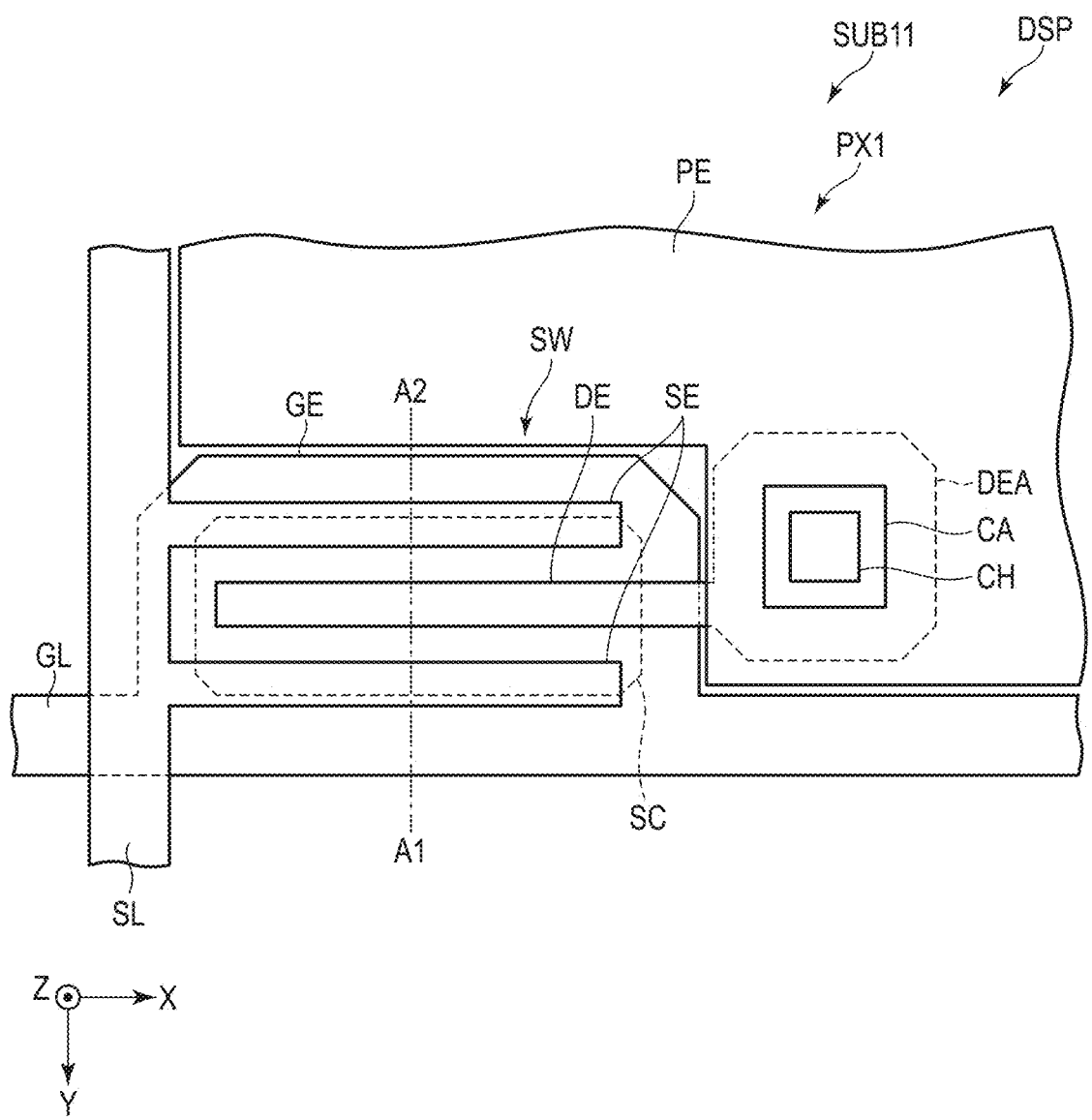
FIG. 7 is an enlarged plan view showing an example of a switching element shown in FIG. 6.

FIG. 7 is an enlarged plan view of an example of the switching element shown in FIG. 6. The switching element SW comprises a semiconductor layer SC, a gate electrode GE, a source electrode SE, and a drain electrode DE. The gate electrode GE is formed to be integrated with the respective scanning line GL. The semiconductor layer SC overlaps the gate electrode GE. Two source electrodes SE are integrally formed with the signal lines SL and are each in contact with the semiconductor layer SC. The drain electrode DE is located between the two source electrodes SE and is in contact with the semiconductor layer SC. The drain electrode DE has a connection portion DEA. The connection portion DEA is electrically connected to the pixel electrode PE via an opening CA formed in the capacitor electrode CSE and a contact hole CH.

Figure 8:
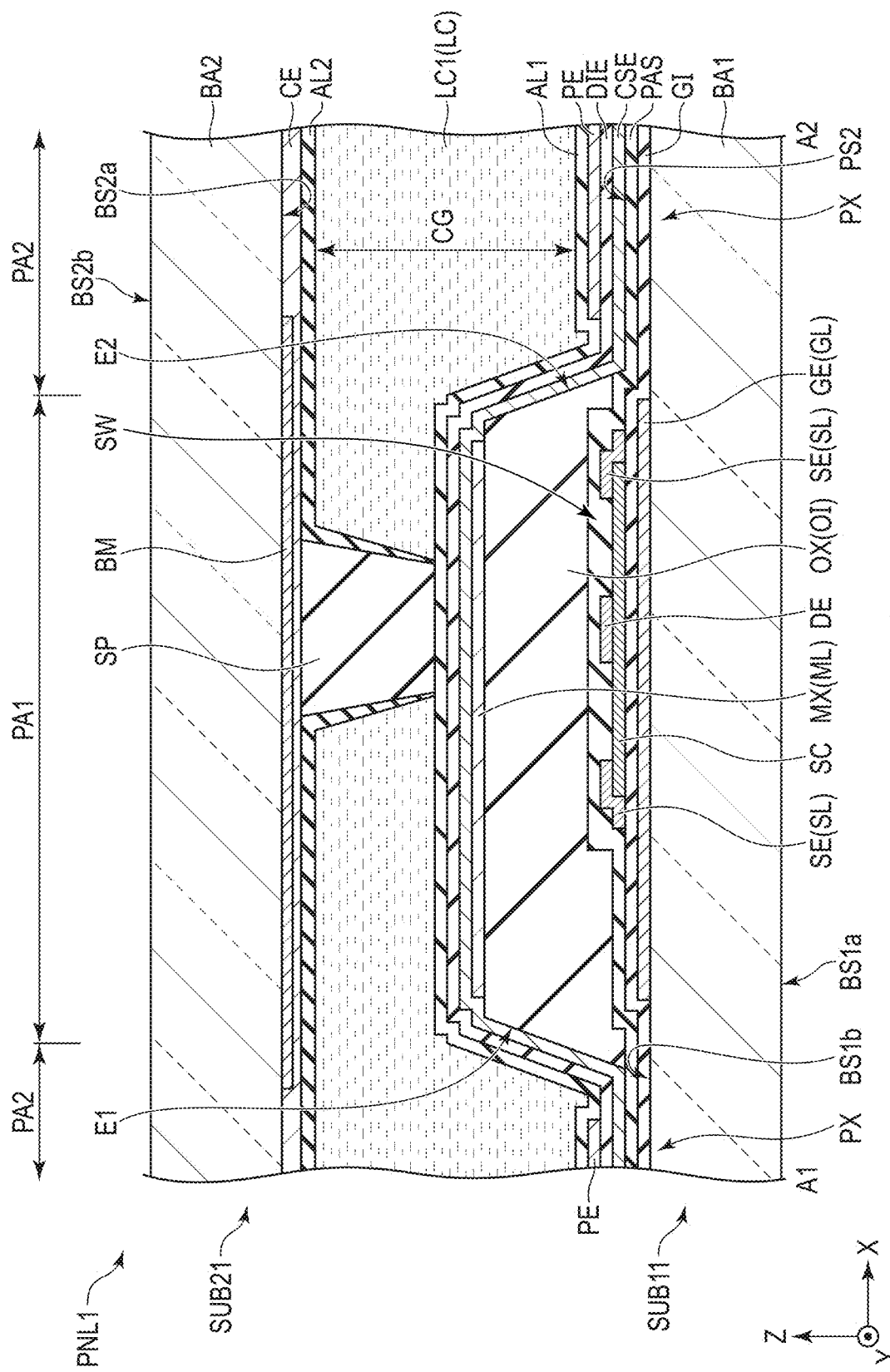
FIG. 8 is a cross-sectional view showing the display device taken along line A1-A2 shown in FIG. 7.

FIG. 8 is a cross-sectional view taken along line A1-A2 of the display panel shown in FIG. 7. The substrate SUB11 further comprises a base BA1, an insulating layer GI, an insulating layer PAS, an insulating layer DIE, and an alignment film AL1. The base BAL comprises a main surface (lower surface) BS1a and another main surface (upper surface) BS1b on an opposite side to the main surface BS1a. The main surface BS1a and the main surface BS1b are places substantially parallel to the X-Y plane. The main surface (lower surface) BS1a and the main surface (upper surface) BS1b of the base BAL correspond to the lower surface and the upper surface of the substrate SUB11. Similarly, the main surface (lower surface) BS1a and the main surface (upper surface) BS1b of the base BAL correspond to the lower surface and the upper surface of the substrate SUB12.

The gate electrode GE integrated as one body with the scanning line GL is located on a main surface BS1b side. The insulating layer GI covers the gate electrode GE and the scanning line GL and is in contact with the main surface BS1b. The semiconductor layer SC is located on the insulating layer GI directly above the gate electrode GE.

The two source electrodes SE integrated as one body with the signal line SL are each in contact with the semiconductor layer SC and a part of each thereof is located on the insulating layer GI. The drain electrode DE is in contact with the semiconductor layer SC. The insulating layer PAS covers each of the semiconductor layer SC, which constitute the switching device SW, the source electrode SE, and the drain electrode DE, and also covers the insulating layer GI.

The first portion OX of the organic insulating layer OI is brought into contact with an upper surface PS2 of the insulating layer PAS directly above the gate electrode GE and the scanning line GL, or directly above the switching element SW. The first wiring portion MX of the metal wiring line ML is located on the first portion OX, directly above the gate electrode GE and the scanning line GL, or directly above the switching element SW.

The capacitor electrode CSE covers the first wiring portion MX and the first portion Ox in the first area PA1. In other words, the first side surface E1 and the second side surface E2 of the first portion Ox are covered by the capacitor electrode CSE. The first wiring section MX is in contact with the capacitor electrode CSE so that they are electrically connected to each other. The capacitor electrode CSE is in contact with the upper surface PS2 of the insulating layer PAS in the second area PA2.

The insulating layer DIE is disposed in the first area PA1 and the second area PA2 and covers the capacitor electrode CSE. Each of the pixel electrodes PE is located on the insulating layer DIE in the second area PA2. The pixel electrode PE and the capacitor electrode CSE oppose each other via the insulating layer DIE and form a storage capacitance necessary for image display in the pixel PX1.

The switching element SW is located between each pair of pixel electrodes PE adjacent to each other along the second direction Y. Each of the first side surface E1 and the second side surface E2 is located between the switching element SW and the pixel electrode PE along the second direction Y. The alignment film AL1 covers the pixel electrode PE and the insulating layer DIE.

The substrate SUB21 comprises a base BA2, a light-shielding layer BM, a common electrode CE, a spacer SP, and an alignment film AL2. The base BA2 comprises a main surface (lower surface) BS2a and a main surface (upper surface) BS2b on an opposite side to the main surface BS2a. The main surface BS2a and the main surface BS2b are planes substantially parallel to the X-Y plane. The main surface BS2a opposes the main surface BS2b.

The light-shielding layer BM and the common electrode CE are disposed on the main plane BS2a. The light-shielding layer BM is located directly above the first side surface E1 and the second side surface E2 of the first portion OX, directly above the switching element SW, and directly above the gate electrode GE.

The common electrode CE is disposed over the plurality of pixels PX and covers the light-shielding layer BM. The common electrode CE is electrically connected to the capacitor electrode CSE and is at the same potential as the capacitor electrode CSE. The spacer SP is provided under the common electrode CE and is in contact with the alignment film AL1. The spacer SP is located between the organic insulating layer OI and the light-shielding layer BM. The alignment film AL2 covers the common electrode CE.

The liquid crystal layer LC1 (a liquid crystal layer LC) is located between the substrate SUB11 and the substrate SUB21 and is in contact with each of the alignment film AL1 and the alignment film AL2.

The base BAL and the base BA2 are insulating bases having transparencies. As these base materials, glass, plastic or the like can be used.

The insulating layer GI, the insulating layer PAS, and the insulating layer DIE are each formed, for example, from a transparent inorganic insulating material such as silicon nitride or silicon oxide. For the insulating layer DIE, an inorganic insulating material having high dielectric constant is preferable. The organic insulating layer OI is formed, for example, of a transparent organic insulating material such as acrylic resin.

The scanning lines GL, the signal lines SL, and the metal wiring line ML are, for example, a stacked body in which a plurality of conductive layers are stacked. An example of such a stacked body can be, for example, one in which a conductive layer containing molybdenum (Mo), a conductive layer containing aluminum (Al), and a conductive layer containing molybdenum (Mo) are stacked in this order. But the stacked body is not limited to this. The stacked body may be one formed by stacking a conductive layer containing titanium (Ti), a conductive layer containing aluminum (Al), and a conductive layer containing titanium (Ti) one on another in this order.

Note that the scanning lines GL may be of a stacked body of a conductive layer containing molybdenum (Mo) and a conductive layer containing aluminum (Al), and it is preferable that the conductive layer containing aluminum (Al) should be in contact with the main surface BS1$b$. Aluminum (Al) has a higher light reflectance than molybdenum (Mo). Therefore, as compared to the case where the conductive layer including molybdenum (Mo) of the scanning lines GL is in contact with the main surface BS1$b$, it is possible to suppress the light propagating through the base material BA1 from being absorbed by the scanning lines GL.

The capacitor electrode CSE, the pixel electrode PE, and the common electrode CE are transparent electrodes each formed of a transparent conductive material such as indium tin oxide (ITO), indium zinc oxide (IZO) or the like.

The light-shielding layer BM is, for example, a conductive layer having a resistance lower than that of the common electrode CE. For example, the light-shielding layer BM is formed by an opaque metal material such as molybdenum, aluminum, tungsten, titanium, silver or the like.

Since the common electrode CE is in contact with the light-shielding layer BM, it is electrically connected to the light-shielding layer BM. With this configuration, the common electrode CE is made to have low resistance.

The alignment film AL1 and the alignment film AL2 are horizontal alignment films having an alignment restriction force that is substantially parallel to the X-Y plane. For example, the alignment film AL1 and the alignment film AL2 are subjected to alignment treatment along the first direction X. The alignment treatment may be a rubbing treatment or a photo-alignment treatment.

The thickness of the liquid crystal layer LC is defined as thickness CG. The thickness CG corresponds to the length along the third direction z from the alignment film AL1 to the alignment film AL2 in the second area PA2. In other words, the thickness CG corresponds to the length between the alignment film AL1 and the alignment film AL2 in the region where the switching element SW and the light shielding layer BM are not provided. The thickness CG should preferably be 2 μm or less. When the thickness CG is 2 μm or more, the threshold voltage of the display panel increases.

However, when the thickness CG of the liquid crystal layer LC of the display panel becomes thinner, the scattering brightness decreases. Therefore, by stacking two display panels as described above, the polymer dispersed liquid crystal layer is made to have lower voltage and the decrease in scattering brightness is suppressed.

Figure 9:
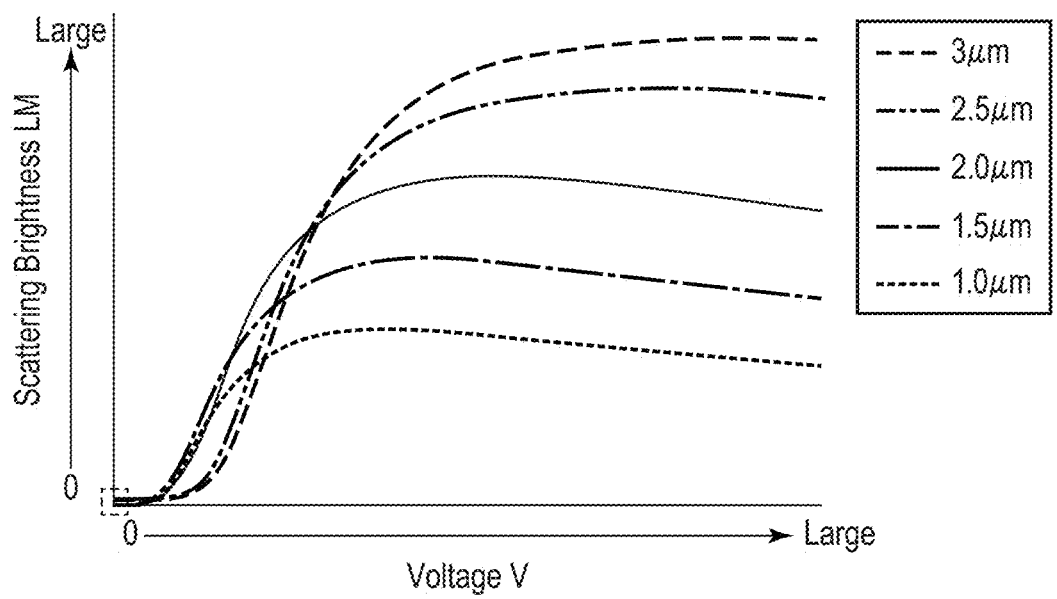
FIG. 9 is a diagram showing the relationship between voltage applied and scattering brightness with respect to the thickness of a liquid crystal layer.
Figure 10:
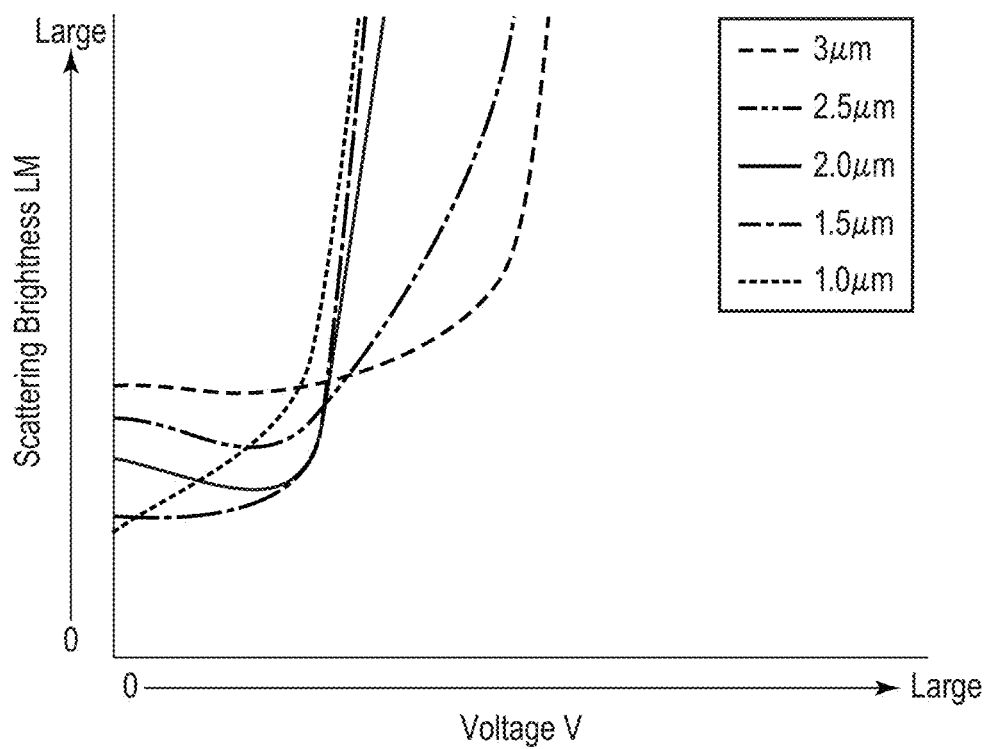
FIG. 10 is an enlarged view showing a portion enclosed by dot line shown in FIG. 9.

FIG. 9 is a diagram showing the relationship between the applied voltage and the scattering brightness with respect to the thickness of the liquid crystal layer. FIG. 10 is an enlarged view of the site surrounded by the dotted line shown in FIG. 9. In other words, FIG. 10 is an enlarged view of the area where the horizontal axis and vertical axis of FIG. 9 are near zero. The horizontal axes shown in FIGS. 9 and 10 indicate a voltage V applied to the liquid crystal layer LC. The vertical axes shown in FIGS. 9 and 10 indicate the scattering brightness of the liquid crystal layer LC. The thickness CG of the liquid crystal layer LC are varied as 3 μm, 2.5 μm, 2 μm, 1.5 μm, and 1.0 μm, and these cases are plotted by a coarse dotted line, a double-dashed line, a solid line, a single-dashed line, and a fine dotted line, respectively.

For example, as shown in FIG. 9, when the thickness CG is small, the scattering intensity LM is small even when the same voltage V is applied. In other words, if the thickness CG is large, the scattering intensity LM is large even when the same voltage V is applied.

Figure 11:
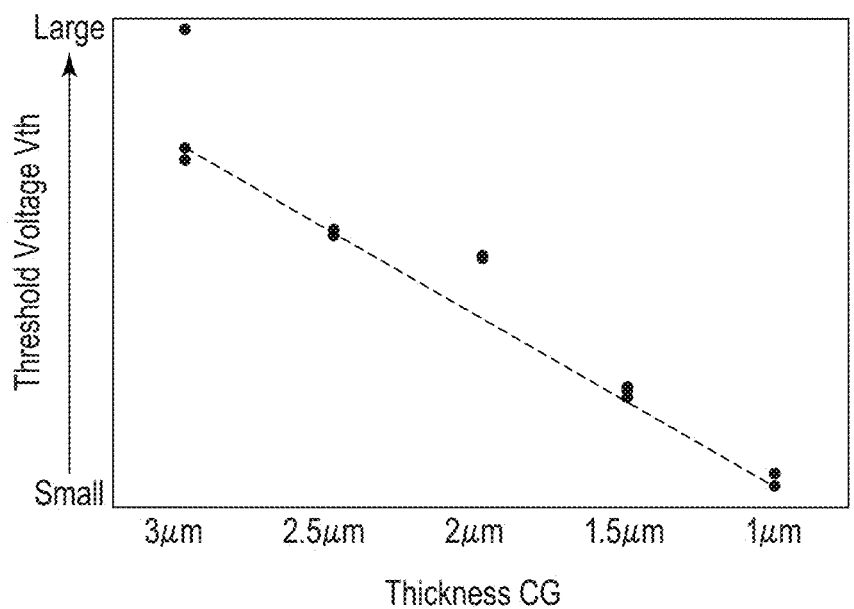
FIG. 11 is a diagram showing the relationship between threshold voltage and the thickness of the liquid crystal layer.

FIG. 11 is a diagram showing the relationship of the threshold voltage with respect to the thickness of the liquid crystal layer. The horizontal axis of FIG. 11 indicates the thickness CG of the liquid crystal layer LC. The vertical axis of FIG. 11 indicates the threshold voltage Vth of the liquid crystal layer LC. As shown in FIG. 11, as the thickness CG decreases, the threshold voltage Vth lowers.

As can be seen from the above, a display panel with a smaller threshold voltage Vth can be obtained by reducing the thickness CG (see FIG. 11). By stacking two display panels as such, a display device DSP with an advantageous effect of increasing the thickness CG can be obtained. With this display device DSP, advantageous effects similar to those of a display panel with a larger thickness CG can be obtained, and therefore a larger scattering intensity LM can be obtained (see FIGS. 9 and 10). Therefore, with this disclosure, it is possible to obtain a display device DSP that can be driven at low voltage and can increase the scattering brightness.

In this disclosure, the substrate SUB11, the substrate SUB21, the substrate SUB12, and the substrate SUB22 may as well be referred to as a substrate 1, a substrate 2, a substrate 3, and a substrate 4, respectively. The liquid crystal layer LC1 and the liquid crystal layer LC2 may as well be referred to as a first polymer dispersed liquid crystal layer and a second polymer dispersed liquid crystal layer, respectively. The light source LS1 and the light source LS2 may as well be referred to as a first light source and a second light source, respectively.

In this disclosure, the pixel PX1 and the pixel PX2 may as well be referred to as a first pixel and a second pixel, respectively. The first area PA1 and the second area PA2 of the first display panel PNL1 may as well be referred to as a first area and a second area, respectively. The first area PA1 and the second area PA2 of the second display panel PNL2 may as well be referred to as a third area and a fourth area, respectively.

In this disclosure, the alignment film AL1 and the alignment film AL2 of the first display panel PNL1 may as well be referred to as a first alignment film and a second alignment film, respectively. The alignment film AL1 and the alignment film AL2 of the second display panel PNL2 may as well be referred to as a third alignment film and a fourth alignment film, respectively. The organic insulating layer OI of the first display panel PNL1 may as well be referred to as a first organic insulating layer, and the organic insulating layer OI of the second display panel PNL2 may as well be referred to as a second organic insulating layer.

In this disclosure, the thickness CG of the first display panel PNL1 may as well be referred to as a first thickness, and the thickness CG of the second display panel PNL2 may as well be referred to as a second thickness. Further, in this disclosure, the structural components of the first display panel PNL1 may be denoted with "first" and the components of the second display panel PNL2 may be denoted with "second". While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a first display panel including a first substrate, a second substrate, and a first polymer dispersed liquid crystal layer provided between the first substrate and the second substrate;
    a second display panel including a third substrate, a fourth substrate, and a second polymer dispersed liquid crystal layer provided between the third substrate and the fourth substrate; and
    a first light source provided at an end portion of the first display panel,
    the first substrate comprising:
    a plurality of first signal lines;
    a plurality of first scanning lines;
    a plurality of first pixels partitioned by the plurality of first signal lines and the plurality of first scanning lines;
    a plurality of first switching elements provided in the plurality of first pixels; and
    a first alignment film,
    the second substrate comprising a second alignment film opposing the first alignment film,
    the third substrate comprising:
    a plurality of second signal lines;
    a plurality of second scanning lines;
    a plurality of second pixels partitioned by the plurality of second signal lines and the plurality of second scanning lines;
    a plurality of second switching elements provided in the plurality of second pixels; and
    a third alignment film,
    the fourth substrate comprising a fourth alignment film opposing the third alignment film, wherein
    the first display panel and the second display panel are disposed to be in contact with each other,
    the first polymer dispersed liquid crystal layer is provided between the first alignment film and the second alignment film,
    the second polymer dispersed liquid crystal layer is provided between the third alignment film and the fourth alignment film,
    a distance between the first alignment film and the second alignment film is set to a first thickness,
    a distance between the third alignment film and the fourth alignment film is set to a second thickness, and
    the first thickness and the second thickness each are 2 µm or less.

2. The display device according to claim 1, further comprising:
    a first light guide provided in contact with the second substrate; and
    a second light guide provided in contact with the fourth substrate.

3. The display device according to claim 1, further comprising:
    a second light source provided at an end portion of the second display panel, wherein
    the first light source is provided to oppose an end portion of the first light guide,
    the second light source is provided to oppose an end portion of the second light guide,
    light from the first light source enters the end portion of the first light guide, and
    light from the second light source enters the end portion of the second light guide.

4. The display device according to claim 3, wherein
    a direction in which the light from the first light source enters the first display panel and a direction in which the light from the second light source enters the second display panel are opposite to each other.

5. The display device according to claim 3, wherein
    a direction in which the light from the first light source enters the first display panel and a direction in which the light from the second light source enters the second display panel are same as each other.

6. The display device according to claim 1, wherein
    the first substrate and the third substrate are provided to be in contact with each other.

7. The display device according to claim 2, wherein
    the first light guide and the third substrate are provided to be in contact with each other.

8. The display device according to claim 1, wherein
    the first substrate comprises a first organic insulating layer overlapping the first switching element,
    the third substrate comprises a second organic insulating layer overlapping the second switching element,
    the plurality of first pixels include a first area where the first organic insulating layer is provided to overlap the plurality of first signal lines and the plurality of first scanning lines, and a second area where the first organic insulating layer is not provided on an inner side of the plurality of first pixels, the plurality of second pixels include a third area where the second organic insulating layer is provided so as to overlap the plurality of second signal lines and the plurality of second scanning lines, and a fourth area where the second organic insulating layer is not provided on an inner side of the plurality of second pixels, the first thickness is a thickness of the first polymer dispersed liquid crystal layer in the second area, and the second thickness is a thickness of the second polymer dispersed liquid crystal layer in the fourth area.

* * * * *